(12) United States Patent
Shin (10) Patent No.: US 9,875,035 B2
(45) Date of Patent: Jan. 23, 2018

(54) MEMORY SYSTEM HAVING A READ AND COPY-BACK OPERATION AND METHOD FOR THE SAME

(71) Applicant: SK hynix Inc., Gyeonggi-do (KR)

(72) Inventor: Beom-Ju Shin, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 0 days.

(21) Appl. No.: 15/219,956

(22) Filed: Jul. 26, 2016

(65) Prior Publication Data
US 2017/0235487 A1 Aug. 17, 2017

(30) Foreign Application Priority Data
Feb. 15, 2016 (KR) .......................... 10-2016-0017007

(51) Int. Cl.
*G11C 16/28* (2006.01)
*G06F 3/06* (2006.01)

(52) U.S. Cl.
CPC .............. *G06F 3/061* (2013.01); *G06F 3/064* (2013.01); *G06F 3/065* (2013.01); *G06F 3/0614* (2013.01); *G06F 3/0659* (2013.01); *G06F 3/0665* (2013.01); *G06F 3/0679* (2013.01)

(58) Field of Classification Search
CPC ........ G06F 3/061; G06F 3/0614; G06F 3/064; G06F 3/065; G06F 3/0659; G06F 3/0665; G06F 3/0679

USPC .......................................................... 365/235
See application file for complete search history.

(56) References Cited

U.S. PATENT DOCUMENTS

| | | | | |
|---|---|---|---|---|
| 7,663,933 B2* | 2/2010 | Tsukazaki | .......... | G11C 16/3418 365/185.25 |
| 7,937,521 B2* | 5/2011 | Reid | .................... | G06F 12/0246 365/185.11 |
| 2008/0259708 A1* | 10/2008 | Tsukazaki | .......... | G11C 16/3418 365/222 |
| 2009/0193174 A1* | 7/2009 | Reid | .................... | G06F 12/0246 711/100 |
| 2016/0104539 A1* | 4/2016 | Kim | ........................ | G11C 16/28 365/185.12 |
| 2016/0163397 A1* | 6/2016 | Sehgal | ................. | G11C 16/349 365/185.09 |

FOREIGN PATENT DOCUMENTS

| KR | 1020090014036 | 2/2009 |
|---|---|---|
| KR | 1020100001355 | 1/2010 |

* cited by examiner

*Primary Examiner* — Richard Elms
*Assistant Examiner* — Xiaochun L Chen
(74) *Attorney, Agent, or Firm* — IP & T Group LLP (57) ABSTRACT

A memory device includes: a memory including a plurality of blocks, each including a plurality of pages; and a control logic that controls a read operation and a copy-back operation on the memory based on a combination of a block read operation number and a page read operation number.

16 Claims, 5 Drawing Sheets

1410 : Block read operation number table
1420 : Page read operation number table
▨ : Not Valid

FIG. 5

▨ : Programmed Page
✕ : Hot Page
▨ : Copied Page
☐ : Erased Page

MEMORY SYSTEM HAVING A READ AND COPY-BACK OPERATION AND METHOD FOR THE SAME

CROSS-REFERENCE TO RELATED APPLICATIONS

The present application claims priority under 35 U.S.C. § 119(a) to Korean Patent Application No. 10-2016-0017007, filed on Feb. 15, 2016, which is incorporated herein by reference in its entirety.

BACKGROUND

1. Field

Exemplary embodiments of the present invention relate to a semiconductor designing technology and, more particularly, to a memory system and an operation method thereof.

2. Description of the Related Art

The computer environment paradigm has shifted to ubiquitous computing systems that can be used anywhere and at any time. Due to this, use of portable electronic devices, such as mobile phones, digital cameras, and notebook computers has rapidly increased. Generally, such portable electronic devices may employ a memory system having one or more memory devices for storing data, also referred to hereinafter as a data storage device. A data storage device may be used as a main or an auxiliary memory device of a portable electronic device.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD). Ever increasing consumer demand for larger capacity, faster and more reliable portable electronic devices require further improvements in data storage devices.

SUMMARY

Embodiments of the present invention are directed to an apparatus and method for copying back some pages according to the number of times that a read operation is performed in a memory system.

Embodiments of the present invention are directed to an apparatus and method that may prevent a read operation error in advance by copying back some pages according to the number of times that a read operation is performed in a memory system, and improve the performance of a read operation by delaying a read retry or a read reclaim that may occur due to the read operation error.

According to an embodiment of the present invention, a memory device, may include: a memory including a plurality of blocks, each including a plurality of pages; and a control logic that controls a read operation and a copy-back operation on the memory based on a combination of a block read operation number, and a page read operation number.

When a block read operation number of a first block among the plurality of the blocks is greater than a first threshold value, the control logic may manage a page read operation number for each page of the first block.

When a page read operation number for a first page of the first block is greater than a second threshold value, the control logic may copy the first page into a second page of a second block among the plurality of the blocks, and invalidates the first page.

The second block may be an open block.

The first threshold value and the second threshold value may be decided based on physical properties of the memory.

The control logic may include a counting unit that counts the block read operation number and the page read operation number in response to a read operation command.

The control logic may include a storage unit that stores the block read operation number and the page read operation number.

The memory may include a storage unit that stores the block read operation number and the page read operation number.

The page read operation number may be linked to the block read operation number.

The plurality of the blocks may be grouped into a plurality of block groups, and the block read operation number may include the number of times that a read operation is performed on each block group, which is a block group read operation number.

According to another embodiment of the present invention, a method for operating a memory device, may include: receiving a read operation command on a memory including a plurality of blocks, each including a plurality of pages; and controlling a read operation and a copy-back operation on the memory based on a combination of a block read operation number, and a page read operation number.

The controlling of the read operation and the copy-back operation may include counting a block read operation number of a corresponding block of the memory in response to the read operation command; and when the block read operation number is greater than a first threshold value, counting a page read operation number of a corresponding page of the corresponding block.

The controlling of the read operation and the copy-back operation may further include: when the page read operation number of the corresponding page is greater than a second threshold value, copying the corresponding page into an empty page of another block to which the corresponding page does not belong among the plurality of the blocks and invalidating the corresponding page.

The counting of the block read operation number of the corresponding block may include: grouping the plurality of the blocks into a plurality of block groups; and counting the number of times that a read operation is performed on each block group, which is a block group read operation number.

The method may further include: storing the block read operation number of the memory and the page read operation number in at least one between the memory and a control logic of the memory device that controls the read operation and the copy-back operation.

The page read operation number may be linked to the block read operation number.

The controlling of the read operation and the copy-back operation may further include: when there is no page read operation number linked to the block read operation number, counting the block read operation number; and deciding whether the block read operation number is greater than a first threshold value.

The controlling of the read operation and the copy-back operation may further include: when the block read operation number is greater than the first threshold value, linking a page read operation number to the block read operation number and storing the page read operation number.

The controlling of the read operation and the copy-back operation may further include: when there is a page read operation number linked to the block read operation number, counting the page read operation number of the corresponding block; and deciding whether the page read operation number is greater than a second threshold value.

The controlling of the read operation and the copy-back operation may further include: when the page read operation number of the corresponding page is greater than the second threshold value, copying the corresponding page into an empty page of another block to which the corresponding page does not belong among the plurality of the blocks and invalidating the corresponding page.

DETAILED DESCRIPTION

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Terms and words used in the present specification including the claims should not be construed to be limited to their common or dictionary meaning, but should be construed in the context of the description and drawings of the present specification.

The present invention may include multiple variations and embodiments in addition to the embodiments which are described herein as examples of the present invention. Hence, as it should be apparent to those skilled in the art of the invention, the described embodiments are not intended to limit the scope of the present invention. Also, the constituent elements of the described embodiments should be understood to include all modifications, substitutes and equivalents that fall within the scope of the invention. In this perspective, the following FIGS. 1 to 7 that are used to describe the present invention should be construed not to be restrictive but to be illustrative.

Figure 1:
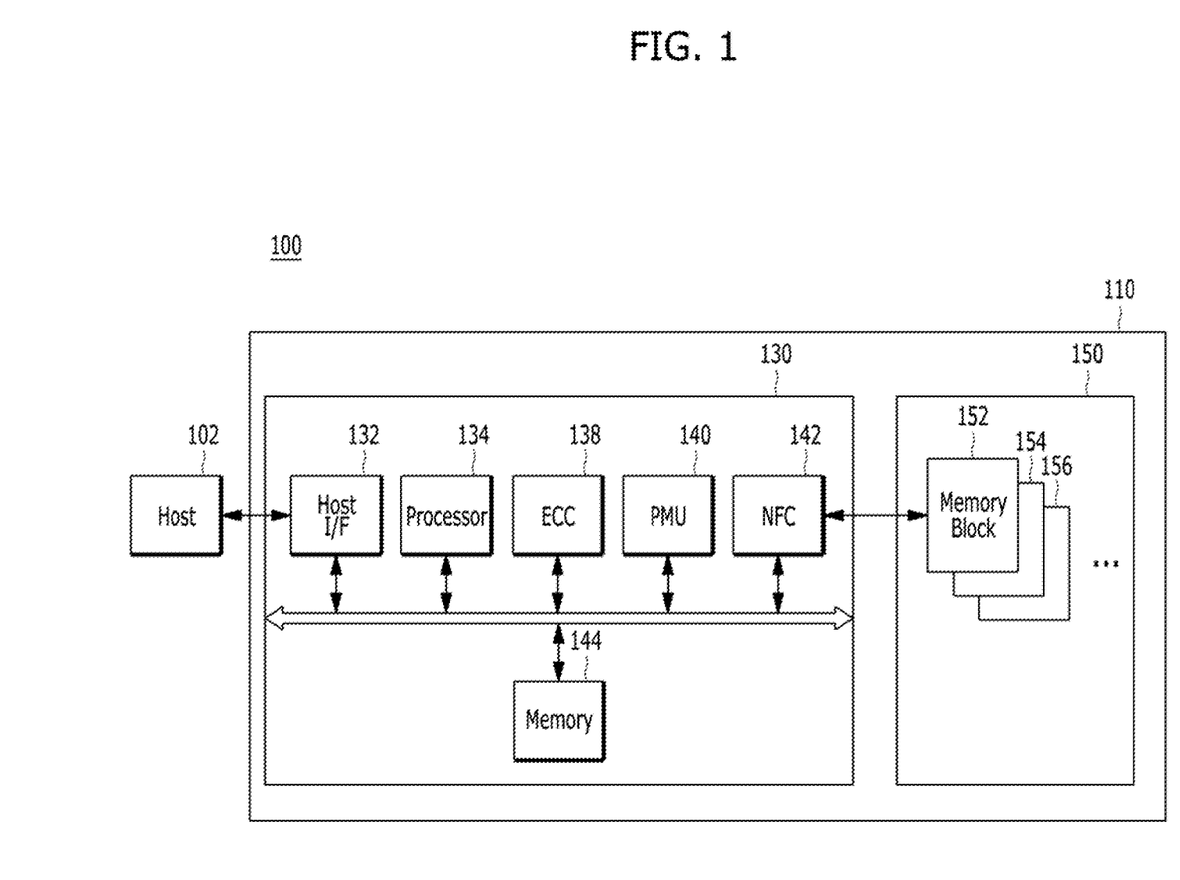
FIG. 1 is a diagram illustrating a data processing system including a memory system, according to an embodiment of the invention.

Referring now to FIG. 1 a data processing system 100 is provided, according to an embodiment of the present disclosure.

According to the embodiment of FIG. 1, the data processing system 100 may include a host 102 and a memory system 110 operatively coupled to each other.

The host 102 may be or include a portable electronic device, such as a mobile phone, an MP3 player and a laptop computer. The host 102 may also be or include an electronic device, such as a desktop computer, a game player, a TV and a projector.

The memory system 110 may operate in response to a request from the host 102. For example, the memory system 110 may store data to be accessed by the host 102. The memory system 110 may be used as a main memory system of the host 102. The memory system 110 may be used as an auxiliary memory system of the host 102. The memory system 110 may be or include any one of various storage devices, according to the protocol of a host interface to be coupled electrically with the host 102. The memory system 110 may be or include any one of various storage devices, such as a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be or include a volatile memory device, such as a dynamic random access memory (DRAM), a static random access memory (SRAM) and the like. The storage devices for the memory system 110 may be or include a nonvolatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM), and the like.

The memory system 110 may include a memory device 150 and a controller 130. The memory device 150 may store data to be accessed by the host 102. The controller 130 may control the storage of data in the memory device 150.

The controller 130 and the memory device 150 may be integrated into a single semiconductor device. For instance, the controller 130 and the memory device 150 may be integrated into a single semiconductor device configured as a solid state drive (SSD). When the memory system 110 is configured as a SSD, the operation speed of the host 102 that is coupled electrically with the memory system 110 may be significantly increased.

The controller 130 and the memory device 150 may be integrated into a single semiconductor device configured as a memory card. For instance, the controller 130 and the memory device 150 may be integrated into a single semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

For another instance, the memory system 110 may be or include a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102 during a write operation. The memory device 150 may provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) may be coupled electrically. The memory cells may be single bit or multi bit cells.

The memory device 150 may retain stored data when power supply to the memory device 150 is interrupted or turned off. The memory device 150 may be a nonvolatile memory device, such as, for example, a flash memory. The flash memory may have a three-dimensional (3D) stack structure.

The controller 130 may control the memory device 150 in response to a request from the host 102. The controller 130 may control the flow of data between the memory device 150 and the host 102. For example, the controller 130 may provide data read from the memory device 150 to the host 102, and store data provided from the host 102 into the memory device 150. To this end, the controller 130 may control the overall operations of the memory device 150, such as read, write, program and erase operations.

In the example of FIG. 1, the controller 130 may include a host interface unit 132, a processor 134, an error correction code (ECC) unit 138, a power management unit 140, a NAND flash controller (NFC) 142, and a memory 144.

The host interface unit 132 may process commands and data provided from the host 102. The host interface unit 132 may communicate with the host 102 through at least one of various interface protocols, such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), integrated drive electronics (IDE) and the like.

The ECC unit 138 may detect and correct errors in the data read from the memory device 150 during a read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation, such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include all circuits, systems or devices needed for the error detection and correction operation.

The PMU 140 may provide and or manage power for the controller 130, that is, power for the component elements included in the controller 130. Any suitable power module may be used.

The NFC 142 may serve as a memory interface between the controller 130 and the memory device 150 for allowing the controller 130 to control the memory device 150 in response to a request from the host 102. The NFC 142 may generate control signals for the memory device 150 and process data under the control of the processor 134 when the memory device 150 is a flash memory (i.e., a NAND flash memory). Although, FIG. 1 illustrates an embodiment wherein the memory device 150 is a NAND flash memory, the invention is not limited in this way. When a memory device other than NAND flash memory is employed, then a different memory interface unit 142 is employed for providing an interface between the controller 130 and the memory device 150 for allowing the controller 130 to control the memory device 150 in response to a request from the host 102.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be or include any suitable memory device. The memory 144 may be a volatile memory. The memory 144 may be or include a static random access memory (SRAM). The memory 144 may be or include a dynamic random access memory (DRAM). The memory 144 may include any suitable architecture. For example, the memory 144 may include a program memory, a data memory, a write buffer, a read buffer, a map buffer, and the like all of which are well known in the art.

The processor 134 may control the various operations of the memory system 110. For example, the processor 134 may control a write or a read operation for the memory device 150, in response to a write or a read request from the host 102. The processor 134 may be or comprise any suitable processor. The processor 134 may drive firmware, which is referred to as a flash translation layer (FTL), to control the operations of the memory system 110. The processor 134 may be or include a microprocessor. Any suitable microprocessor may be used. The processor 134 may be or include a central processing unit (CPU).

A bad block management unit (not shown) may be included in the processor 134, for performing bad block management of the memory device 150. The bad block management unit may find bad memory blocks included in the memory device 150, which are in unsatisfactory condition for further use, and perform bad block management on the bad memory blocks. When the memory device 150 is a flash memory (e.g., a NAND flash memory or a NOR flash memory), a program failure may occur during the write operation (i.e., the program operation), due to characteristics of a flash memory logic function. During a bad block management operation, the data of a program-failed memory block ("the bad block") may be programmed into a new memory block. Bad blocks due to a program fail may seriously deteriorate the utilization efficiency of the memory device 150 and the reliability of the memory system 100. Thus, reliable bad block management may be included in the processor 134 for resolving these concerns.

Figure 2:
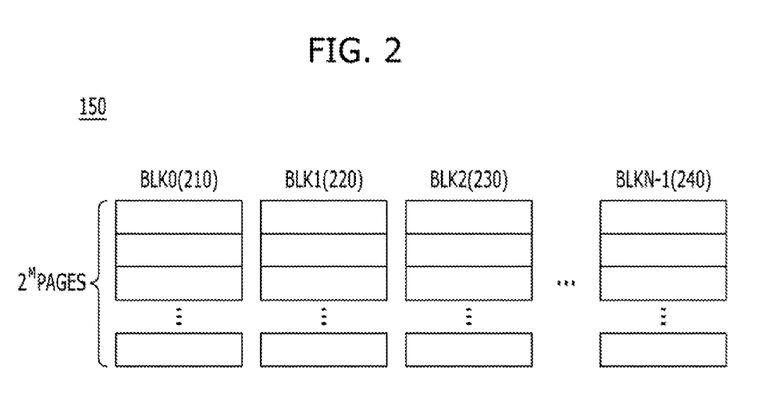
FIG. 2 is a diagram illustrating a memory device of the memory system shown in FIG. 1, according to an embodiment of the invention.

FIG. 2 illustrates an example of a memory device 150 shown in FIG. 1.

1 The memory device 150 may include a plurality of memory blocks. For example, the memory device 150 may include zeroth to (N−1)$^{th}$ blocks BLK0 210 to BLKN−1 240. Each of the plurality of memory blocks 210 to 240 may include a plurality of pages. For example, each of the plurality of memory blocks 210 to 240 may include $2^M$ number of pages ($2^M$ PAGES). Each of the plurality of pages may include a plurality of memory cells to which a plurality of word lines may be coupled electrically. The number of memory blocks, the number of pages in each memory block, and the number of memory cells in each page may vary based on design.

The memory blocks may be single level cell (SLC) memory blocks or multi-level cell (MLC) memory blocks, according to the number of bits which may be stored or expressed in each memory cell. An SLC memory block may include a plurality of pages including a plurality of memory cells, wherein each memory cell is capable of storing 1-bit data. An MLC memory block may include a plurality of pages including a plurality of memory cells, wherein each memory cell is capable of storing multi-bit data (e.g., two or more-bit data). An MLC memory block including a plurality of pages which are implemented with memory cells that are each capable of storing 3-bit data may be defined as a triple level cell (TLC) memory block.

Each of the plurality of memory blocks 210 to 240 may store the data provided from the host 102 during a write operation, and may provide stored data to the host 102 during a read operation.

Figure 3:
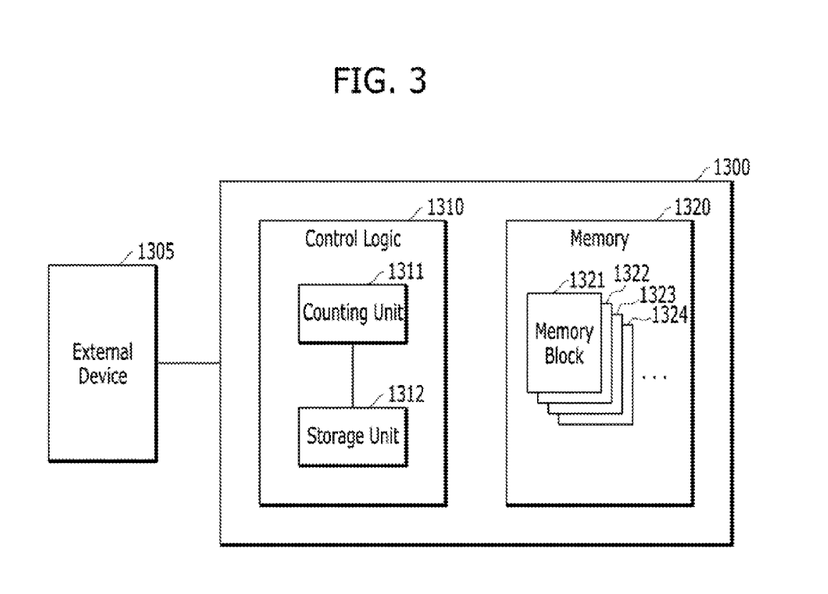
FIG. 3 is a block diagram illustrating a memory system, according to an embodiment of the present invention.

FIG. 3 is a block diagram illustrating a memory system including a memory device 1300, according to an embodiment of the present invention. The embodiment of the memory device 1300 shown in FIG. 3 is an example of the present invention. Hence, variations of the illustrated embodiment, as well as other embodiments of the memory device, may be envisaged by those skilled in the art to which this invention pertains without departing from the scope of the present invention.

Referring to FIG. 3, the memory device 1300 may include a control logic 1310, and a memory 1320. The memory device 1300 is coupled with an external device 1305. In this embodiment of the present invention, the memory device 1300 may be a constituent element that corresponds to the memory system 110 shown in FIG. 1. According to another embodiment of the present invention, the memory device 1300 may be a constituent element that corresponds to the memory device 150 of the memory system 110 shown in FIG. 1. According to an embodiment of the present invention, the external device 1305 may be the host 102 shown in FIG. 1. According to another embodiment of the present invention, the external device 1305 may be the memory controller 130 shown in FIG. 1.

The memory 1320 may include a plurality of memory blocks, for example, memory blocks 1321, 1322, 1323 and 1324, as illustrated in FIG. 3. Each of the memory blocks 1321, 1322, 1323 and 1324 may include a plurality of pages. According to an embodiment of the present invention, the memory 1320 may be a constituent element that corresponds to the memory device 150 shown in FIG. 2.

The control logic 1310 controls the various operations of the memory 1320. For example, the control logic 1310 may operate the memory 1320 in response to an operation command, such as, a read operation command, a write operation command (also referred to as a program operation command) and an erase operation command. The operation command may be transmitted from the external device 1305 to the memory device 1300.

In an embodiment, the control logic 1310 may control a read operation and a copy-back operation to be performed on the memory 1320 in response to a read operation command. The control logic 1310 may control the read operation and the copy-back operation based on a combination of the number of read operations for the page and block of the memory 1320 that correspond to the read operation command target address, as will be explained below.

The control logic 1310 includes a counting unit 1311 and a storage unit 1312. The counting unit 1311 counts the number of times that a read operation is performed for each block and each page of the memory 1320. The storage unit 1312 stores the number of times that a read operation is performed for each block and each page of the memory device 1320.

Figure 4:
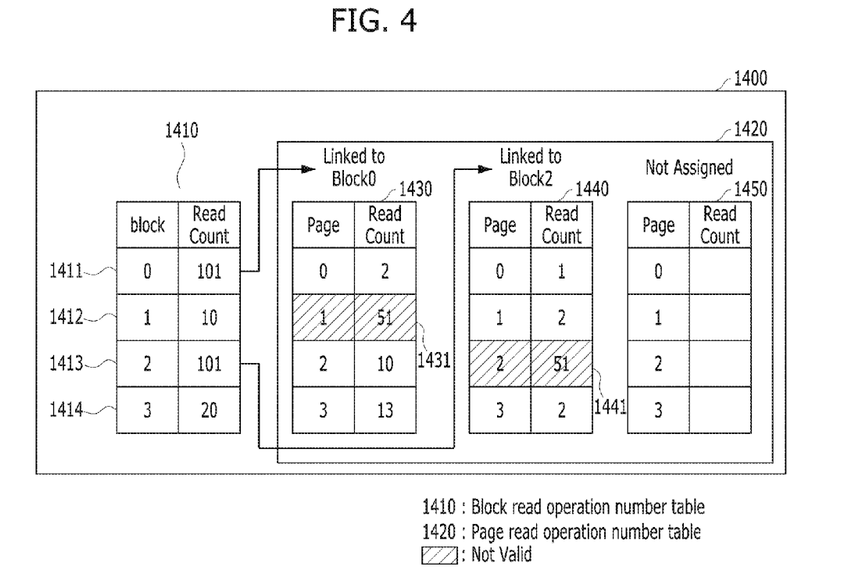
FIG. 4 is a block diagram illustrating a storage unit, according to an embodiment of the present invention.

FIG. 4 is a block diagram illustrating a storage unit 1400, according to an embodiment of the present invention. The storage unit 1400 may be a constituent element that corresponds to the storage unit 1312 included in the control logic 1310 illustrated in FIG. 3. The storage unit 1400 stores the number of times that a read operation is performed on each of the memory blocks 1321, 1322, 1323 and 1324 of the memory 1320, as counted by the counting unit 1311. According to an embodiment of the present invention, the storage unit 1400 may include the memory 144 shown in FIG. 1. According to another embodiment of the present invention, the storage unit 1400 may be included in a portion of the memory blocks 152, 154 and 156 illustrated in FIG. 1. According to yet another embodiment of the present invention, the storage unit 1400 may be included in the memory 144 shown in FIG. 1 during a normal operation, and then when a predetermined time passes or power is turned off, contents of the storage unit 1400 may be copied into a portion of the memory blocks 152, 154 and 156 illustrated in FIG. 1.

The storage unit 1400 may include a block read operation number table 1410 and a page read operation number table 1420. The block read operation number table 1410 is a table for storing the number of times that a read operation is performed on each of the memory blocks 1321, 1322, 1323 and 1324 of the memory 1320. According to an embodiment of the present invention, the block read operation number table 1410 may store the number of times that a read operation is performed on each of the memory blocks 1321, 1322, 1323 and 1324 as 1411, 1412, 1413 and 1414, respectively. According to another embodiment of the present invention, when the memory blocks 1321, 1322, 1323 and 1324 are grouped into a plurality of block groups (e.g., block groups 1 to 4), the block read operation number table 1410 may store the number of times that a read operation is performed on each block group as 1411, 1412, 1413 and 1414, respectively. According to yet another embodiment of the present invention, when the memory blocks 1321, 1322, 1323 and 1324 are grouped on the basis of a super block unit (e.g., super blocks 1 to 4) that is managed by a flash translation layer (FTL), the block read operation number table 1410 may store the number of times that a read operation is performed on each super block as 1411, 1412, 1413 and 1414, respectively.

When the number of times that a read operation is performed on the blocks stored in the block read operation number table 1410 is greater than a first threshold value, the page read operation number table 1420 stores the number of times that a read operation is performed on each page of the blocks. For example, let us assume for illustration purposes that the first threshold value is '100', and the read operation number count values of a block 0 and a block 2 stored in the block read operation number table 1410 are '101' and '130' (1411 and 1413), respectively. Since the read operation number count values for these blocks are greater than the first threshold value, read operation number tables 1430 and 1440 for storing the number of times that a read operation is performed on each page of the blocks 0 and 2, respectively, may be assigned. According to an embodiment of the present invention, the read operation number tables 1430 and 1440 may be linked to the corresponding blocks 1411 and 1413 of the block read operation number table 1410 and managed, respectively. Also, as illustrated in FIG. 4, the page read operation number table 1420 may include an empty table 1450 which is not yet assigned yet, other than the read operation number tables 1430 and 1440 linked to the blocks 1411 and 1413, respectively.

The read count values stored in the block read operation number table 1410 and the page read operation number table 1420 of FIG. 4 may be generated by the counting unit 1311 of the control logic 1310 of FIG. 3. For example, upon receipt of a new read request for the memory 1320, the counting unit 1311 that counts the number of times that a read operation is performed on each block, updates the read count value for the block corresponding to the newly received read request into the block read operation number table 1410. When the number of times that a read operation is performed for a block (e.g. blocks 1411, 1413) becomes greater than a first threshold value (e.g., '100'), the counting unit 1311 then starts counting the number of times that a read operation is performed on each page of the block, and stores the read count values in the page read operation number table 1420. When there are read count values greater than a second threshold value (e.g., '50') among the read count values stored in the page read operation number table 1420 (which are pages 1431 and 1441), the control logic 1310 may invalidate the corresponding pages and manage an invalidated management table (not shown) separately. The page read operation number table 1420 may be linked to the block read operation number table 1410 and managed. According to an embodiment of the present invention, the first threshold value and the second threshold value may be decided based on the physical properties of the memory 1320.

A greatest read operation number for each block without an error may be decided based on the physical properties of the memory 1320. According to an embodiment of the present invention, the first threshold value may be set to be a value smaller than the greatest read operation number to allow disabling a page before it runs the risk of becoming a faulty page due to the number of read cycles performed on the page. According to an embodiment of the present invention, the second threshold value may be set to be a value so that the sum of the first threshold value and the second threshold value is smaller than the greatest read operation number. For example, when it is assumed that the greatest read operation number for each block is 'K', the first threshold value may be set to be a value ranging from 0.3K to 0.5K, which are 30 to 50% of the greatest read operation number for each block, and the second threshold value may be set to be a value such that the sum of the first threshold value and the second threshold value become approximately 80% of the greatest read operation number for each block. According to an embodiment of the present invention, if strong read disturbance property appears due to the physical properties of the memory 1320, the greatest read operation number for each block is decided relatively great, and accordingly the first and second threshold values are set to larger values. If weak read disturbance property appears due to the physical properties of the memory 1320, the greatest read operation number for each block is decided to be relatively smaller, and accordingly the first and second threshold values are set to smaller values.

Figure 5:
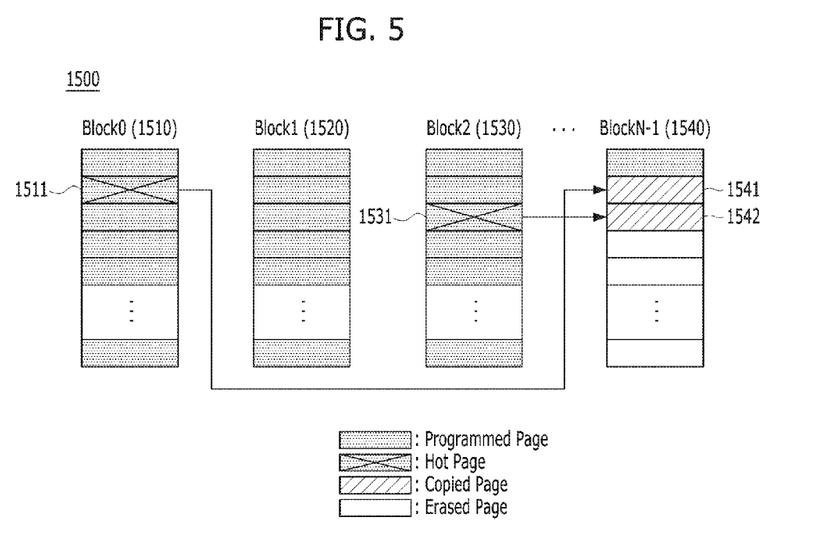
FIG. 5 is a conceptual diagram illustrating a copy-back operation performed on a memory device, according to an embodiment of the present invention.

FIG. 5 is a conceptual diagram illustrating a copy-back operation performed on a memory device 1500 according to an embodiment of the present invention. For example, the copy-back operation illustrated in FIG. 5 may be an operation performed when both the block read operation number and the page read operation number are stored in the storage unit 1400, as illustrated in FIG. 4. According to an embodiment of the present invention, the copy-back operation may be performed by the control logic 1310 shown in FIG. 3.

Referring to FIG. 5, the memory device 1500 may include a plurality of memory blocks, which include a zeroth block Block0 1510, a first block Block1 1520, a second block Block2 1530 and a (N–1)th block BlockN–1 1540. Each of the blocks 1510, 1520, 1530 and 1540 may include a plurality of pages (e.g., $2^M$ pages). According to the embodiment shown in FIG. 4, the number of times that a read operation is performed on the zeroth block Block0 1411 and the second block Block2 1413 is greater than the first threshold value, and the number of times that a read operation is performed on the first page 1431 of the zeroth block Block0 1411 and the second page 1441 of the second block Block2 1413 is greater than the second threshold value. According to the embodiment shown in FIG. 4, a first page 1511 of the zeroth block Block0 1510 and a second page 1531 of the second block Block2 1530 are respectively copied into a first page 1541 and a second page 1542 of the (N–1)th block BlockN–1 1540, which are empty pages, while the first page 1511 of the zeroth block Block0 1510 and the second page 1531 of the second block Block2 1530 are invalidated. According to an embodiment of the present invention, the (N–1)th block BlockN–1 1540 may be an open block on which a program operation is being performed.

Figure 6:
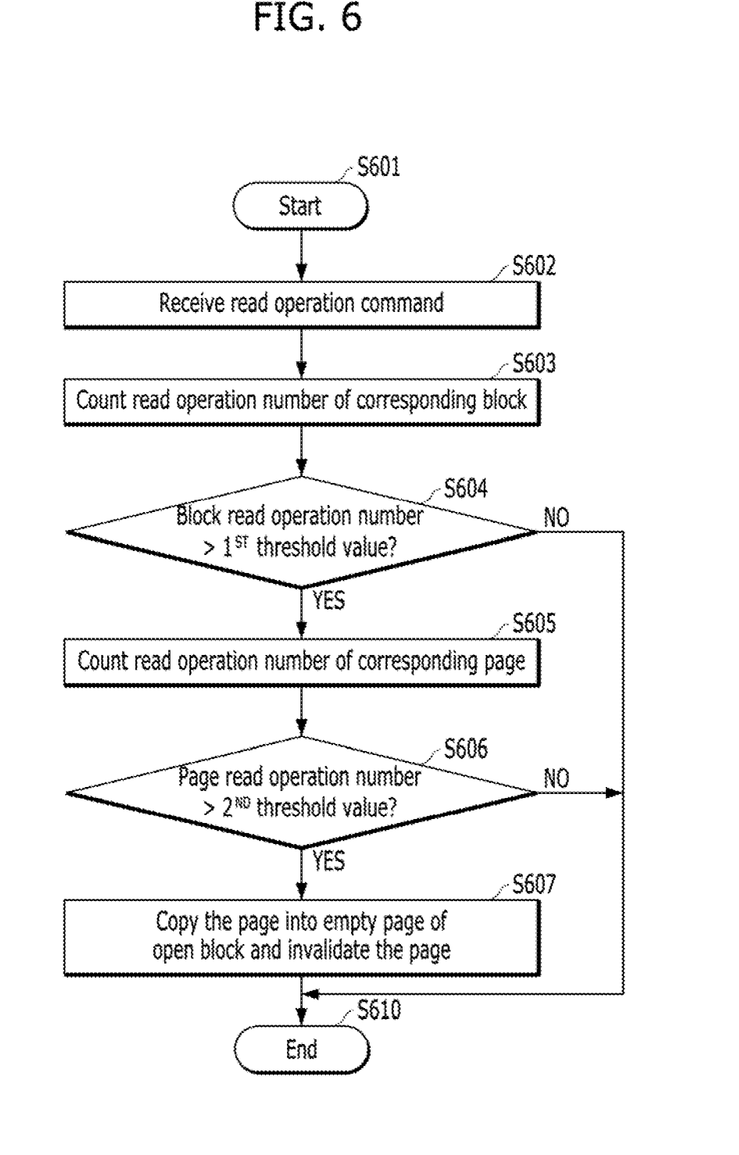
FIG. 6 is a flowchart of a method for operating a memory system, according to an embodiment of the present invention.

Referring now to FIG. 6 a flowchart of an operating method of a memory system is provided, according to an embodiment of the present invention. The process illustrated in the flowchart may be performed by the control logic 1310 when an operation command (e.g., a read operation command) is transferred from the external device 1305 to the memory device 1300 as illustrated in FIG. 3. The embodiment of the flowchart shown in FIG. 6 is not restrictive but illustrative only.

According to the flowchart of FIG. 6, the control logic 1310 receives a read operation command from the external device 1305 in step S602.

In step S603, the control logic 1310 counts the number of times that a read operation is performed on a block of the memory 1320 that corresponds to the read operation command in response to the read operation command. To be more specific, the counting unit 1311 of the control logic 1310 may count the number of times that a read operation is performed on the block corresponding to the targeted address of the received command.

In step S604, the control logic 1310 decides whether the number of times that a read operation is performed on the corresponding block (referred to as a block read operation number herein) is greater than a first threshold value.

If the block read operation number is not greater than the first threshold value (step S604, NO), the process proceeds to a step S610 and ends.

If the block read operation number is greater than the first threshold value (step S604, YES), the control logic 1310 in step S605 also counts the number of times that a read operation is performed on a corresponding page of the memory 1320 that corresponds to the target address of the received read operation command. To be more specific, the counting unit 1311 of the control logic 1310 may count the number of times that a read operation is performed on the corresponding page.

In step S606, the control logic 1310 decides whether the number of times that a read operation is performed on the corresponding page (referred to as a page read operation number herein) is greater than a second threshold value.

If the page read operation number is not greater than the second threshold value (step S606, NO), the process proceeds to the step S610 and ends.

If the page read operation number is greater than the second threshold value (step S606, YES), the control logic 1310 copies the corresponding page into an empty page of another block (e.g., an open block), and invalidates the corresponding page in step S607. The first and second threshold values may be set as explained above based on the physical characteristics of the memory to prevent using a memory page that has an unacceptable high probability to become faulty based on the number of read cycles performed on the memory page.

Figure 7:
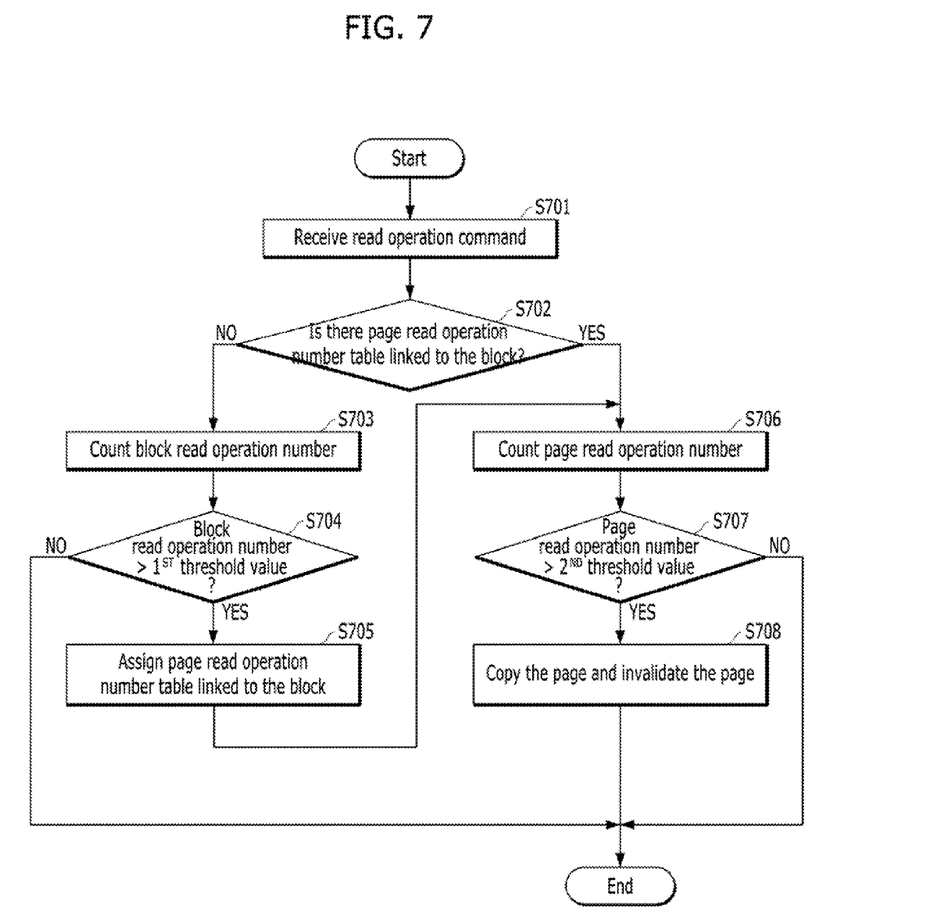
FIG. 7 is a flowchart of a method for operating a memory system including the storage unit of FIG. 4, according to another embodiment of the present invention.

FIG. 7 is a flowchart illustrating a method for operating a memory system, according to another embodiment of the present invention. The process may be performed by the control logic 1310 when an operation command (e.g., a read operation command) is transferred from the external device 1305 to the memory device 1300 shown in FIG. 3. The embodiment of the flowchart shown in FIG. 7 is not restrictive but illustrative only.

Referring to FIG. 7, the control logic 1310 receives a read operation command in step S701.

In step S702, the control logic 1310 checks out whether there is a page read operation number table linked to a corresponding block of the memory 1320 that corresponds to the read operation command.

If it is decided that there is a page read operation number table linked to the corresponding block (step S702, YES), the control logic 1310 counts the number of times that a read operation is performed on the corresponding page of the memory 1320 that corresponds to the read operation command and stores the page read operation number in the linked page read operation number table in step S706. To be more specific, the counting unit 1311 of the control logic 1310 may count the number of times that a read operation is performed on the corresponding page.

If it is decided that there is no page read operation number table linked to the corresponding block (step S702, NO), the number of times that a read operation is performed on the corresponding block is counted in step S703. To be more specific, the counting unit 1311 of the control logic 1310 may count the number of times that a read operation is performed on the corresponding block.

In step S704, the control logic 1310 decides whether the number of times that a read operation is performed on the corresponding block (referred to as a block read operation number herein) is greater than the first threshold value.

If the block read operation number is not is greater than the first threshold value (step S704, NO), the control logic 1310 ends the process.

If the block read operation number is greater than the first threshold value (step S704, YES), the control logic 1310 assigns an empty page read operation number table linked to the block corresponding to the read operation command in step S705. In step S706, the control logic 1310 counts the number of times that a read operation is performed on the page of the memory 1320 (referred to as a page read operation number) and stores the page read operation number in the linked page read operation number table. To be more specific, the counting unit 1311 of the control logic 1310 may count the number of times that a read operation is performed on the corresponding page.

In step S707, the control logic 1310 decides whether the page read operation number is greater than the second threshold value.

If the page read operation number is not greater than the second threshold value (step S707, NO), the control logic 1310 ends the process.

If the page read operation number is greater than the second threshold value (step S707, YES), the control logic 1310 copies the corresponding page into an empty page of another block (e.g., an open block), and invalidates the corresponding page in step S708.

According to the embodiments of the present invention described above, a read operation error may be prevented in advance by copying back some pages according to the number of times that a read operation is performed in a memory system, and the performance of a read operation may be improved by delaying a read retry or a read reclaim that may occur due to the read operation error.

While the present invention has been described with respect to the described embodiments, it will be apparent to those skilled in the art that various changes and modifications may be made without departing from the spirit and scope of the invention as defined in the following claims.

What is claimed is:

1. A memory device, comprising:
   a memory including a plurality of blocks, each including a plurality of pages; and
   a control logic having a counting unit suitable for counting block read operations and page read operations in response to a read operation command and a storage unit suitable for storing a block read operation number table which includes a block identifier and a block read operation number, and a page read operation number table which includes a page identifier and a page read operation number,
   wherein the counting unit counts the block read operation number for each read operation of a corresponding block,
   wherein when a block read operation number of a first block among the plurality of the blocks is greater than a first threshold value, the control logic links the block read operation number table to the page read operation number table and the counting unit counts the page read operation number for each read operation of a corresponding page, and
   wherein when a page read operation number for a first page of the first block is greater than a second threshold value, the control logic copies the first page into a second page which is an empty page of a second block among the plurality of the blocks, and invalidates the first page.

2. The memory device of claim 1, wherein the second block is an open block.

3. The memory device of claim 1, wherein the first threshold value and the second threshold value are decided based on physical properties of the memory.

4. The memory device of claim 1, wherein the plurality of the blocks are grouped into a plurality of block groups.

5. The memory device of claim 4, wherein the block read operation number table further includes a block group read operation number which is the number of times that a read operation is performed on each block group.

6. A method for operating a memory device, comprising:
receiving a read operation command on a memory including a plurality of blocks, each including a plurality of pages;
controlling a read operation and a copy-back operation on the memory based on a block read operation number table which includes a block identifier and a block read operation number and a page read operation number table which includes a page identifier and a page read operation number,
counting the block read operation number of a corresponding first block among the plurality of blocks of the memory in response to the read operation command;
linking the block read operation number table to the page read operation number table and counting the page read operation number for a first page of the first block when the block read operation number is greater than a first threshold value, and
copying the first page into a second page which is an empty page of a second block among the plurality of the blocks, and invalidating the first page when the page read operation number for the first page of the first block is greater than a second threshold value.

7. The method of claim 6, wherein the counting of the block read operation number of the corresponding block includes:
grouping the plurality of the blocks into a plurality of block groups.

8. The method of claim 6, further comprising:
storing the block read operation number table and the page read operation number table in a control logic of the memory device that controls the read operation and the copy-back operation.

9. The method of claim 7, wherein the block read operation table further includes a block group read operation number which is a number of times that a read operation is performed on each block group.

10. The memory device of claim 6, wherein the second block is an open block.

11. The memory device of claim 6, wherein the first threshold value and the second threshold value are decided based on physical properties of the memory.

12. A memory device, comprising:
a memory including a plurality of blocks, each including a plurality of pages; and
a control logic having a counting unit suitable for counting block read operations and s page read operations in response to a read operation command and a storage unit suitable for storing a block read operation number table which includes a block identifier and a block read operation number, and a page read operation number table which includes a page identifier and a page read operation number,
wherein the control logic is suitable for controlling a read operation and a copy-back operation on the memory by determining whether the block read operation number table is linked to the page read operation number table,
wherein when the block read operation number table is not linked to the page read operation number table, the counting unit counts a block read operation number for each read operation of a corresponding block,
wherein when the block read operation number table is linked to the page read operation number table, the counting unit counts a page read operation number for each read operation of a corresponding page,
wherein when a block read operation number of a first block among the plurality of blocks is greater than a first threshold value, the control logic links the block read operation number table to the page read operation number table, and
wherein when a page read operation number for the first page of the first block is greater than a second threshold value, the control logic copies the first page into a second page which is an empty page of a second block among the plurality of the blocks, and invalidates the first page.

13. The memory device of claim 12, wherein the second block is an open block.

14. The memory device of claim 12, wherein the first threshold value and the second threshold value are decided based on physical properties of the memory.

15. The memory device of claim 12, wherein the plurality of the blocks are grouped into a plurality of block groups.

16. The memory device of claim 15, wherein the block read operation table further includes a block group read operation number which is the number of times that a read operation is performed on each block group.

* * * * *